United States Patent
Grüning

(10) Patent No.: US 6,495,913 B2
(45) Date of Patent: Dec. 17, 2002

(54) SEMICONDUCTOR CLAMPED-STACK ASSEMBLY

(75) Inventor: Horst Grüning, Wettingen (CH)

(73) Assignee: ABB Industrie AG, Baden (CH)

( * ) Notice: Subject to any disclaimer, the term of this patent is extended or adjusted under 35 U.S.C. 154(b) by 0 days.

(21) Appl. No.: 09/910,773

(22) Filed: Jul. 24, 2001

(65) Prior Publication Data

US 2002/0017717 A1 Feb. 14, 2002

(30) Foreign Application Priority Data

Aug. 2, 2000 (EP) .............................................. 00810695

(51) Int. Cl.$^7$ ............................................... H01L 23/02
(52) U.S. Cl. ...................... 257/718; 257/691; 257/685; 257/708; 257/709; 257/710; 257/711; 257/712; 257/713; 257/714; 257/715; 257/716; 257/717; 257/718; 257/719; 257/720; 257/721; 257/722; 257/723; 257/724; 257/725; 257/726; 257/727; 257/730; 257/686; 361/690; 361/691; 361/692; 361/693; 361/694; 361/695; 361/707; 361/708; 361/709; 361/710; 361/711
(58) Field of Search ................................. 257/177, 181, 257/685, 686, 688, 706, 707, 712, 713, 718, 719, 720, 726, 727, 723, 730, 691; 361/690–695, 707–711

(56) References Cited

U.S. PATENT DOCUMENTS

| | | | | |
|---|---|---|---|---|
| 3,573,569 A | * | 4/1971 | Davis et al. ................. | 317/234 |
| 5,119,175 A | * | 6/1992 | Long et al. .................... | 357/82 |
| 5,675,466 A | | 10/1997 | Matsumoto et al. | |
| 5,771,155 A | * | 6/1998 | Cook .......................... | 361/710 |
| 5,898,582 A | * | 4/1999 | Denis et al. .................. | 363/68 |
| 6,324,073 B1 | * | 11/2001 | Mikosz et al. .............. | 361/809 |
| 6,333,853 B2 | * | 12/2001 | O'Leary et al. ............ | 361/704 |

FOREIGN PATENT DOCUMENTS

| | | |
|---|---|---|
| DE | 28 38 342 | 3/1980 |
| DE | 196 34 823 | 3/1998 |
| DE | 198 30 424 | 1/2000 |
| EP | 0 971 408 | 1/2000 |

OTHER PUBLICATIONS

Dr. Peter Steimer, et al., "Serienschaltung von GTO–Thyristoren fur Frequenzumrichter hoher Leistung", AVV Technik May/1996, pp. 14–20.

* cited by examiner

Primary Examiner—Nathan J. Flynn
Assistant Examiner—Fazli Erdem
(74) Attorney, Agent, or Firm—Burns, Doane, Swecker & Mathis, L.L.P.

(57) ABSTRACT

A semiconductor clamped-stack assembly (32) has at least two clamped stacks, each of these clamped stacks having a plurality of power semiconductor components (8) and a plurality of heat sinks (6), which are arranged in series along a horizontally extending axial direction (A). According to the invention, power semiconductor components (8) from different clamped stacks are assigned to one another and are located in a common mounting plane, which is perpendicular to the axial directions (A) of the clamped stacks (31). Mutually associated power semiconductor components (8) can be removed from the clamped-stack assembly or, respectively, inserted into the clamped-stack assembly in a common mounting direction, which lies in the mounting plane. Mutually associated power semiconductor components (8) are preferably mounted on a common plate (14). As a result, they can be dismantled when the clamped-stack assembly (32) is loosened, without further power semiconductor components or heat sinks having to be dismantled. The plate (14) is hooked into frame rods (1) belonging to the clamped-stack assembly (32) or guided in guide rails (18).

14 Claims, 9 Drawing Sheets

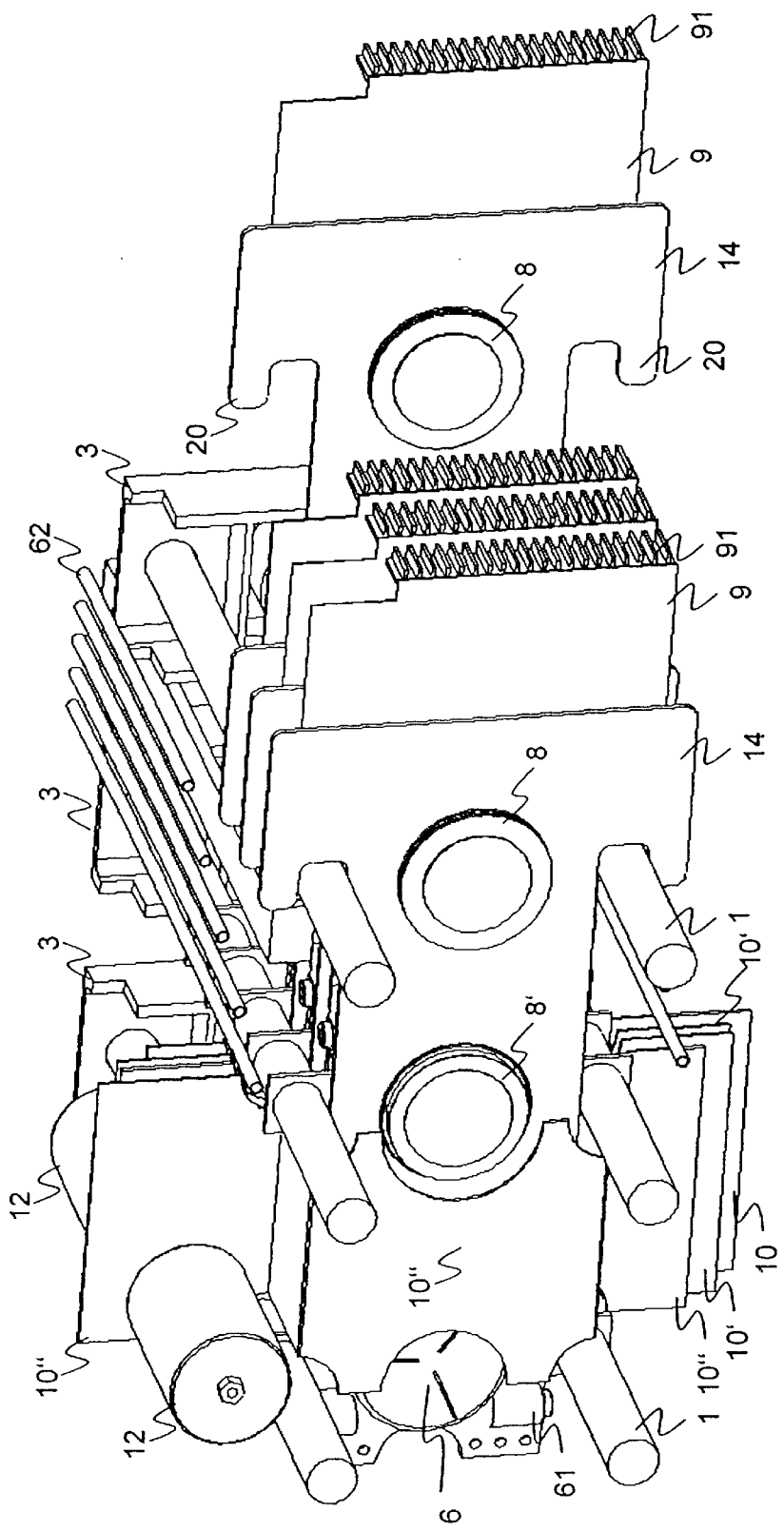

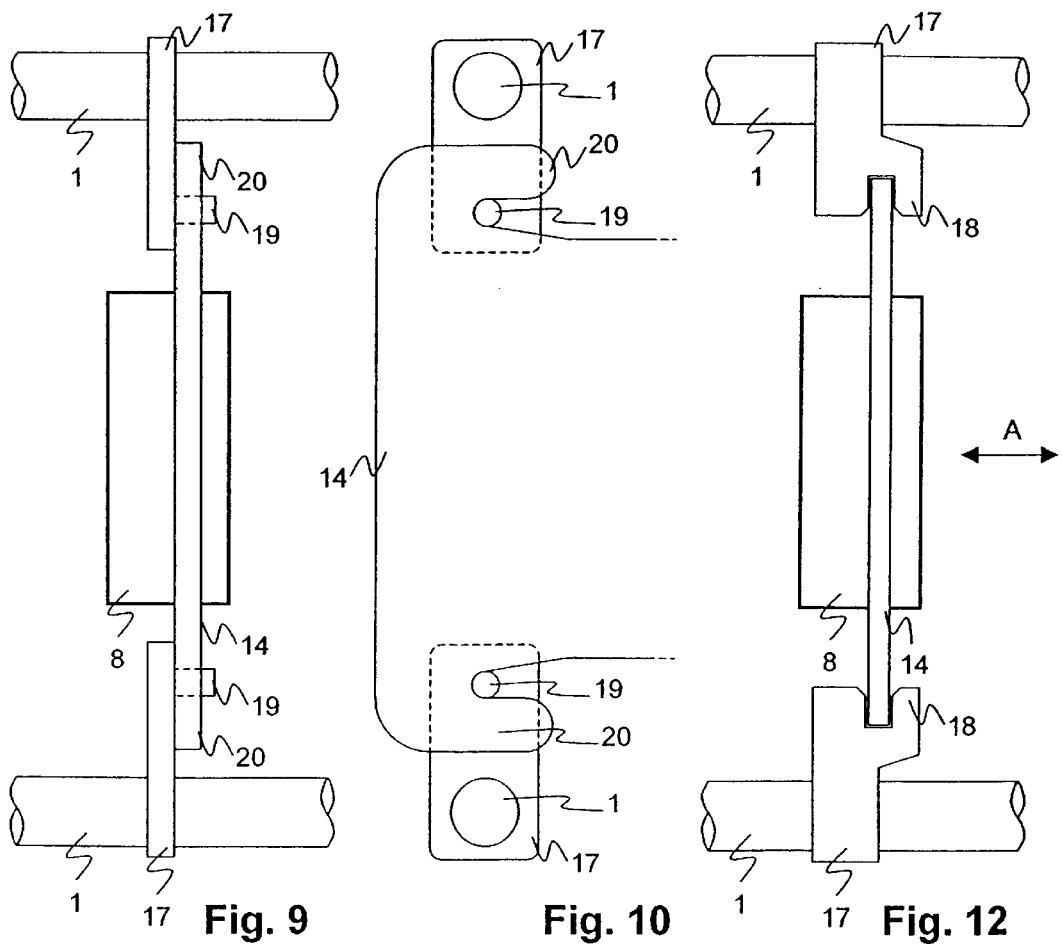
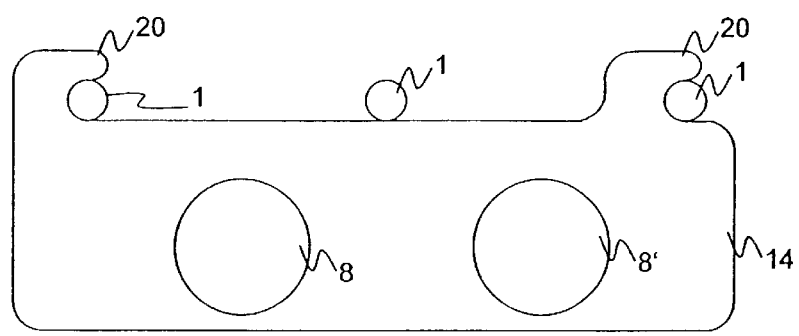
Fig. 9　　Fig. 10　　Fig. 12
Fig. 11

SEMICONDUCTOR CLAMPED-STACK ASSEMBLY

The invention relates to the field of power semiconductor technology. It relates to a semiconductor clamped-stack assembly, in particular for current converters, according to the preamble of Patent claim 1.

In known water-cooled high-power current converters, a plurality of power semiconductor components (PS) are alternately combined in a series of circuits with cooling cans through which water flows, in order to form a stack or clamped stack. The required electrical and thermal characteristics are achieved by means of mechanical bracing by means of tie rods. In order to replace a defective semiconductor component, the clamp stack is loosened, during which process all the components must still be held in their position centered with respect to the stack axis.

In the latest generation of power semiconductor switches for high-power converters, a GTO (Gate Turn Off) thyristor, an IGBT (Insulated Gate Bipolar Transistor) or an IGCT (Insulated Gate Controlled Thyristor) accommodated in a presspack case is connected to a board, on which the associated drive unit is also arranged. Such a semiconductor clamped-stack assembly with horizontal clamped stacks is disclosed, for example, by the document by P. Steimer et al. "Serieschaltung von GTO-Thyristoren für Frequenzumrichter hoher Leistung", [series connection of GTO thryistors for high-power frequency converters], ABB Technik 5 (1996), PP 14–20.

FIG. 5 in that document shows how the power semiconductor component and drive unit form a replaceable unit.

DE 198 30 424 A1 discloses a molding for holding heat sinks in a vertical clamped stack. The latter holds a heat sink and a power semiconductor component which is immediately adjacent and mounted on a board. An individual power semiconductor component in an individual stack can be replaced by the stack being loosened and being pressed on with a special tool. This leads to a high loading on adjacent power semiconductor components.

In the case where a number of clamped stacks are combined to form a clamped-stack assembly, as in the above mentioned document by P. Steimer et al., the individual clamped stacks block the access to the other clamped stacks located behind them. This makes access for replacing power semiconductor components more difficult. This leads to the situation where either clamped stacks are arranged with a large spacing from one another or where there must be sufficient space around a clamped-stack assembly in order to permit access to all the clamped stacks. Such arrangements prevent a compact design of a converter. A compact design is possible if a clamped-stack assembly or phase module can be removed or replaced as a whole, so that simple access to the power semiconductor components in the removed clamped-stack assembly is possible. However, this leads to a considerable outlay in that in order to replace a single defective power semiconductor component, the entire clamped-stack assembly has to be dismantled.

It is therefore an object of the invention to provide a semiconductor clamped-stack assembly of the type mentioned at the beginning which eliminates the above mentioned disadvantages.

This object is achieved by a semiconductor clamped-stack assembly having the features of Patent claim 1.

The semiconductor clamped-stack assembly has at least two clamped stacks, each of these clamped stacks having a number of power semiconductor components (LH) and a number of heat sinks, which are arranged in series along a horizontally extending axial direction, the clamped stacks being arranged parallel to one another in a common frame, and the power semiconductor components being mounted on carrier elements. According to the invention, power semiconductor components from different clamped stacks are assigned to one another and are located in a common mounting plane, which is perpendicular to the axial directions of the clamped stacks, and mutually associated power semiconductor components are capable of being removed from the clamped-stack assembly or, respectively, inserted into the clamped-stack assembly in a common mounting direction, which lies in the mounting plane.

This makes it possible to remove one or more of the mutually associated power semiconductor components from the clamped-stack assembly in the common mounting direction without further power semiconductor components or heat sinks having to be dismantled. The power semiconductor components (8) can therefore be replaced by means of access from only one side of the clamped-stack assembly (32), and it is not necessary for a region around one or around a number of clamped stacks to be kept free, or for the clamped-stack assembly to be removed. This therefore produces a compact clamped-stack assembly which is very simple to maintain, since power semiconductor components can be replaced with little effort. The compact design also means that the stray inductance of connecting conductors can be reduced.

The mutually associated power semiconductor components preferably have common fixing means for fixing to a frame of the clamped-stack assembly. In a first embodiment of the invention, these common fixing means are formed by guide means for a carrier element having a number of power semiconductor components mounted on it. These guide means are hooked into corresponding second connecting elements, which are connected to the frame, or hooked directly into the frame. In a second embodiment of the invention, these common fixing means are formed by guide rails, which guide one or more carrier elements in each case having one or more power semiconductor components mounted on them. In both embodiments, the common fixing means serve to hold the mutually associated power semiconductor components firmly when one or more of the clamped stacks in the clamped-stack assembly are loosened, that is to say are not under pressure. In addition, the common fixing means permit the mutually associated power semiconductor components to move in the common mounting direction and to be removed from the clamped-stack assembly.

The common fixing means have the advantage that the power semiconductor components maintain their position without additional holding parts when the clamped-stack assembly is loosened and, at the same time, can nevertheless also be replaced in a straightforward manner.

In a preferred embodiment of the invention, the clamped stacks in the clamped-stack assembly are arranged horizontally, so that in a loosened stack, individual power semiconductor components are not firmly held or clamped in by the weight of power semiconductor components and heat sinks located above. As a result, no special tools or mechanical aids are needed either in order to force apart heat sinks when replacing a power semiconductor component.

In a further preferred embodiment of the invention, heat sinks from a number of clamped stacks are assigned to one another, and mutually associated heat sinks are located in a common plane, which is perpendicular to the axial directions of the clamped stacks. It is preferable if the mutually associated heat sinks are connected to the frame by means of a common heat sink holder. The common holder for a number of heat sinks reduces the number of parts in a clamped-stack assembly and simplifies the mounting.

It is preferable if an electrical bus bar system for mutually associated heat sinks is formed by sheet metal plates, so that low-inductance electrical connection is produced.

Further preferred embodiments emerge from the dependant patent claims.

In the following text, the subject of the invention will be described in more detail using preferred exemplary embodiments, which are illustrated in the appended drawings, in which:

FIGS. 5–7 show perspective detail views of a clamped stack according to the invention in the first embodiment of the invention, with a partially removed power semiconductor component;

FIGS. 9 & 10 show schematic detail views of a variant of the first embodiment of the invention;

FIG. 11 shows, in schematic form, a further variant of the first embodiment of the invention;

FIG. 12 shows a schematic detail view of a second embodiment of the invention.

The reference symbols used in the drawings and their significance are listed in summary form in the List of Reference Symbols. In principle, identical parts are provided with the same reference symbols in the figures.

Figure 1:
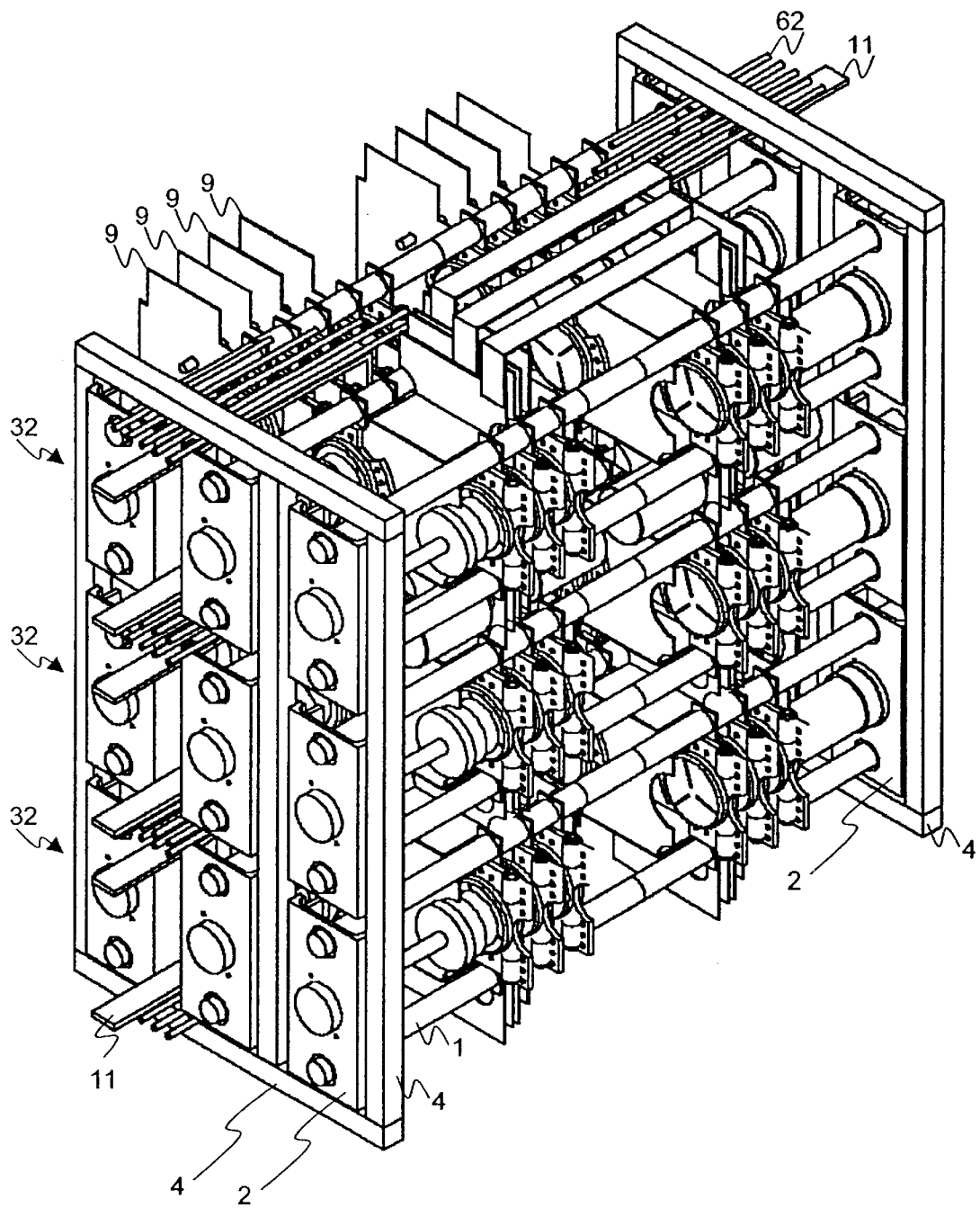
FIG. 1 shows a perspective view of three clamped-stack assemblies according to the invention in a common frame.
Figure 2:
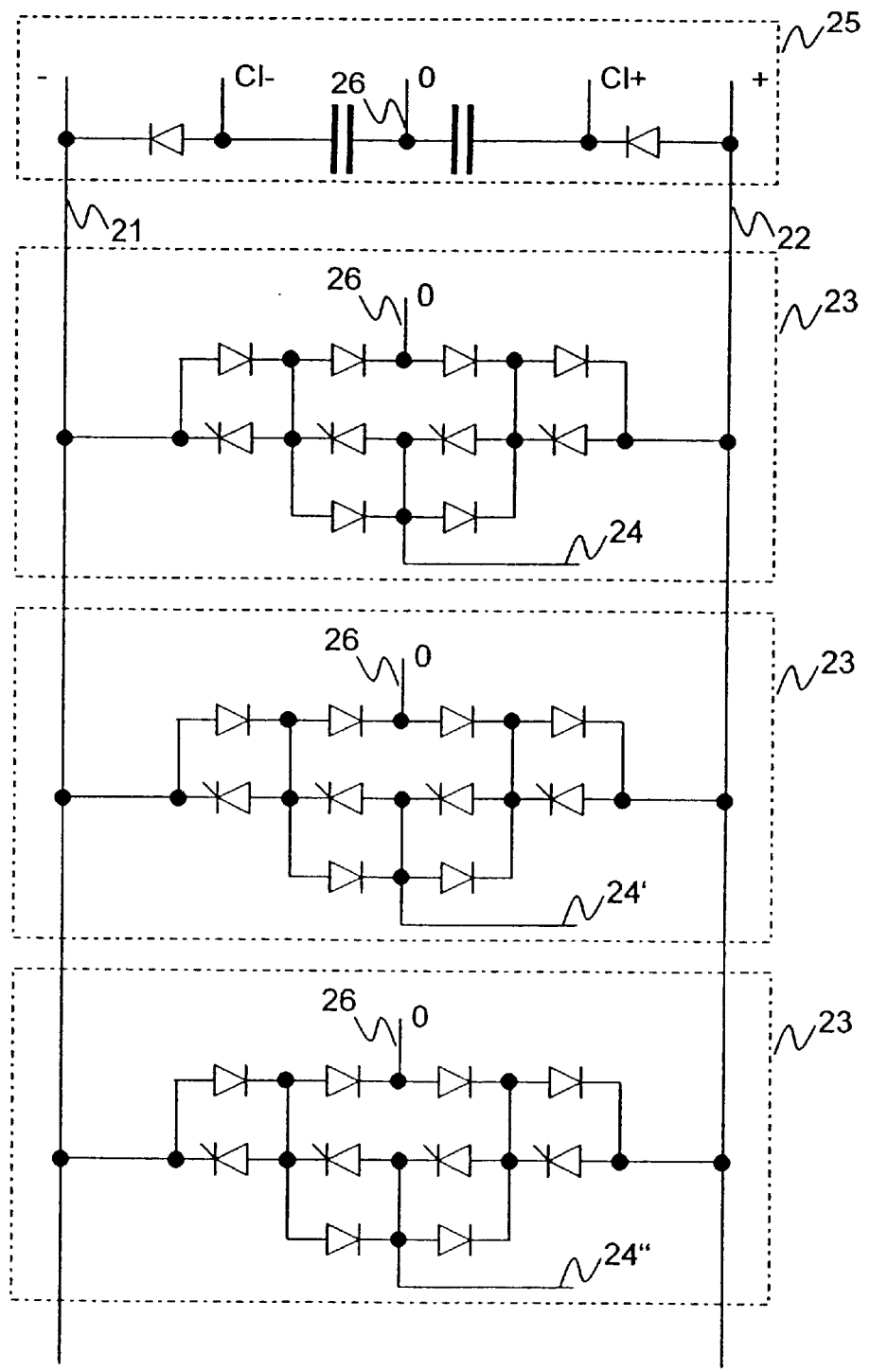
FIG. 2 shows, in schematic form, an electrical circuit corresponding to the arrangement of FIG. 1.

FIG. 1 shows a perspective view of three clamped-stack assemblies 32 according to the invention in a common frame. The clamped-stack assemblies 32 are arranged one above another and each comprise three clamped stacks. The frame has frame rods 1, rod holders 2, end plates 3 visible in FIG. 3 and end-plate reinforcements 4, which together carry the other elements of the clamped-stack assemblies 32. The frame rods 1 are fixed to the rod holders 2, which are in turn fixed to the end plates 3 which are reinforced by the end-plate reinforcements 4. Each two frame rods 1 and rod holders 2 form a clamped stack. The electrical circuit and details of FIG. 1 will be explained by using FIGS. 2 and 3:

FIG. 2 shows, in schematic form, a multi-phase 3-point converter having a negative terminal 21, a positive terminal 22 and a neutral point 26, which are, for example, terminus of an intermediate DC circuit of an inverter. Connected to these terminals are a number of phase modules 23 and a clamp circuit 25. A phase module 23 has, in a known way, power semiconductor components arranged as a 3-point circuit and a phase terminal 24, 24', 24". These power semiconductor components are switching components or diodes. The switching components are preferably GCTs or ICGTs. A phase module 23 in each case switches the negative terminal 21, positive terminal 22 or neutral point 26 to the respective phase terminal 24, 24', 24". The clamp circuit 25 has diodes and capacitors connected in series and is used to limit the voltages from the DC circuit to a negative clamp voltage CL– or respectively, a positive clamp voltage CL+. A current converter may have more than just three phase modules 23. The arrangement shown in FIG. 1 has a total of six phase modules 23 and two clamp circuits 25.

Figure 3:
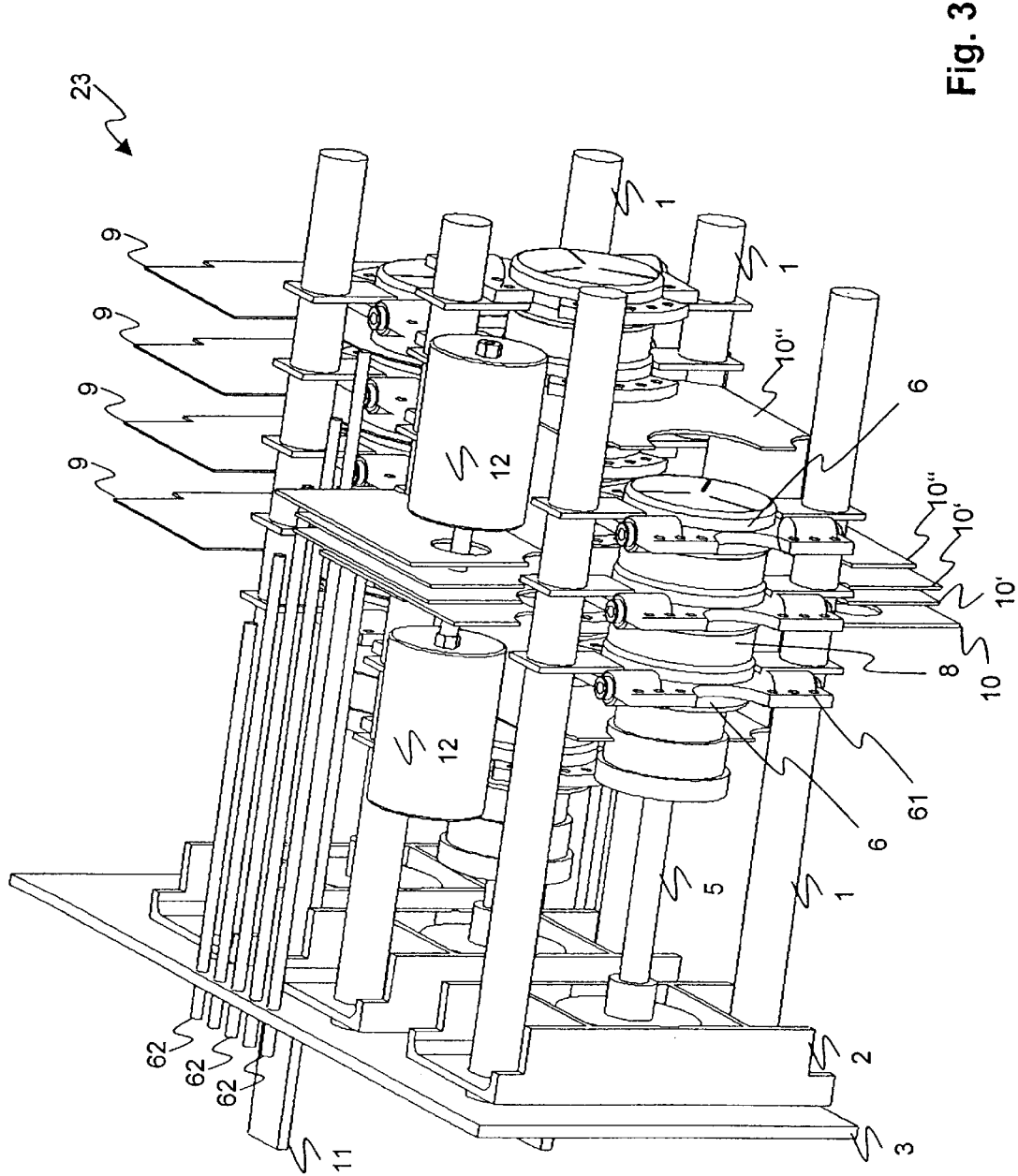
FIG. 3 shows a perspective view of half a clamped-stack assembly.

FIG. 3 shows a perspective view of half of a clamped-stack assembly 32 from FIG. 1, that is to say an individual phase module 23. A detail of one of the edge plates 3 left out of the perspective views in FIG. 1 and those following is depicted here. In addition to the elements already mentioned, push rods 5 are depicted, which press stacks of heat sinks 6 and power semiconductor components 8 together. Further push rods are located on the right of the heat sinks 6 and in line with the push rods 5 shown. However, the further push rods have not been drawn in FIG. 3 and the remaining figures. The heat sinks 6 have cooling water flowing through them and have cooling-water connections 61 to be connected to cooling-water hoses (not shown). These cooling-water hoses lie in the same plane as the respective heat sinks 6, so that access to the power semiconductor components 8 is free.

Of the semiconductor components 8, the switching components, that is to say for example the ICGTs, are provided with drive boards 9, which carry an electronic circuit for driving IGCTs. These drive boards 9 are preferably located on the front side of the clamped-stack assembly 32. Accordingly, the IGCTs are located in a front clamped stack of the clamped-stack assembly 32. Intermediate-circuit plates 10, 10', 10" form an electrical busbar system and connect a number of heat sinks 6 and phase modules 23 located above one another to one another electrically. In this case, for example, a first intermediate-circuit plate 10 forms the negative terminal 21, a second and third intermediate-circuit plate 10' forms the neutral point 26, and a fourth intermediate-circuit plate 10" forms the positive terminal 22. Connected to the second and third intermediate-circuit plates 10' in each case is a clamp capacitor 12 belonging to the clamp circuit 25. Constructing the busbar system by means of sheet-metal plates reduces the stray inductancies of the inverter.

The end plate 3 has leadthroughs, through which busbars 11 and cooling-water lines 62 are laid. The cooling-water lines 62 are connected to cooling-water connections 61 on the heat sinks 6 by means of cooling-water hoses (not shown). Some elements, for example further thrust rods, connections to the clamp capacitors 12 and a suspension from the power semiconductor components 8 are not shown, for reasons of clarity.

Figure 4:
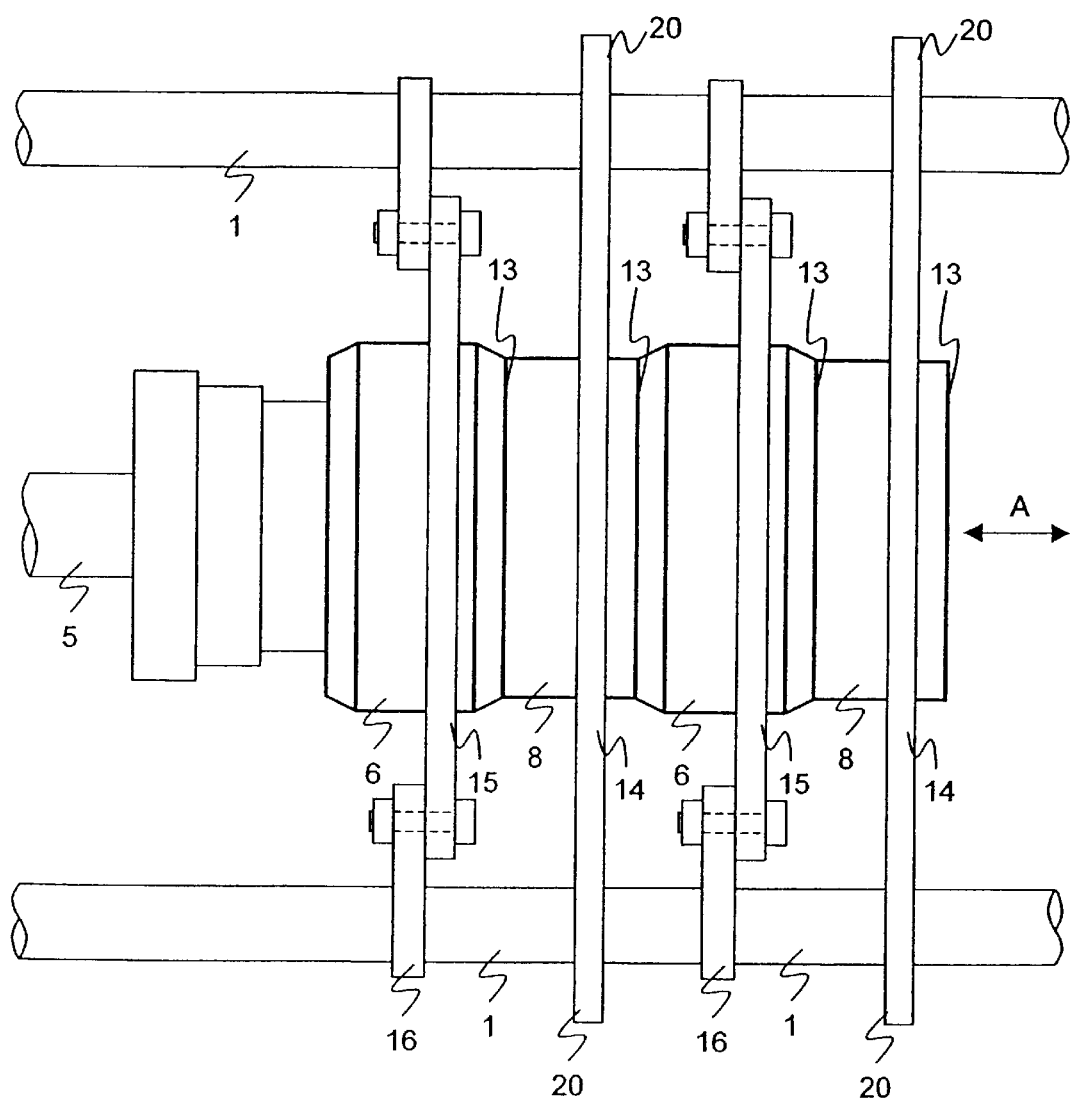
FIG. 4 shows a schematic detail view of a clamped stack according to the invention in a first embodiment of the invention.

FIG. 4 shows a schematic detailed view of a clamped stack according to the invention in a clamped-stack assembly 32 in a first embodiment of the invention. The view shows the front side of the front clamped stack of the clamped-stack assembly 32. The drive boards 9 of the IGCTs are not shown, for reasons of clarity. The clamped stack has power semi-conductor components 8 and heat sinks 6, which are arranged in series along a horizontally extending axial direction A of the clamped stack.

A power semiconductor component 8 has a cylindrical case which, at both ends, is provided with flat round electrodes (anodes, cathodes) for the purpose of electrical and thermal coupling. In the semiconductor stack, a heat sink 6 is in each case arranged on both sides of a power semiconductor component 8 in such a way that one of its contact faces 13 comes into contact with one of the electrodes of the power semiconductor component 8. When the clamped stack is in the braced state, the power semiconductor 8 and heat sink 6 are pressed against each other in the axial direction A by thrust rods 5. The heat sinks 6 are provided with flanges or holders 15 and are connected, via insulating first connecting elements 16, to the frame rod 1. In another variant of the invention, heat sinks 6 are firmly connected to a heat-sink holder 15, the heat-sink holder 15 preferably being a plate or a molding of insulating material. This heat-sink holder 15 is connected to the frame by means of the first connecting elements 16. In a further variant (not shown) of the invention, the heat-sink holder 15 is connected directly to the frame. The heat-sink holder 15 preferably has means for guiding the cooling-water lines. The connection to the frame permits the heat-sink holder 15 to be displaced along the axial direction A of the clamped stack. As a result, the heat sink 6 can likewise move in the axial direction during the clamping or loosening of the clamped stack.

A power semiconductor component 8 is firmly connected to a carrier element, for example a plate 14 preferably made of insulating material. The plate lies in a mounting plane, which lies perpendicular to an axial direction A of the clamped stack.

According to the invention, the plate 14 holds a polarity of power semiconductor components 8 and is detachably connected to the frame by common fixing means. In the first embodiment of the invention, these common fixing means are hooks or hook-like constructions or guide means 20 on the plate 14. By virtue of the guide means 20, the plate 14 can be hooked into the thrust rods 5 of the frame. When the clamped stack of the clamped-stack assembly 32 is in a loosened state, the plate 14 can be moved in the axial direction A. This movement is made easier by the fact that the clamped stack lies horizontally and, as a result, an element in the clamped stack, for example a power semiconductor component 8, is not loaded by the weight of the other elements. The fact that a power semiconductor component 8 is held by a plate 14 means that it does not fall out of the clamped stack when the latter is loosened.

The plate 14 is provided with cut-outs, into which three power semiconductor components 8, 8', 8" are inserted and firmly connected to the plate 14. The three power semiconductor components 8, 8', 8" therefore lie in the common mounting plane and, when the clamped-stack assembly 32 is loosened, they can jointly be removed from the clamped-stack assembly 32 or, respectively, inserted into the clamped-stack assembly 32 in one mounting direction. In order to replace any desired power semiconductor component 8, it is therefore merely necessary for the clamped-stack assembly 32 to be loosened and for the appropriate plate 14 to be pulled out. The mounting direction lies perpendicular to an axial direction A of the clamped stack and perpendicular to the plane of FIG. 4.

Figure 5:
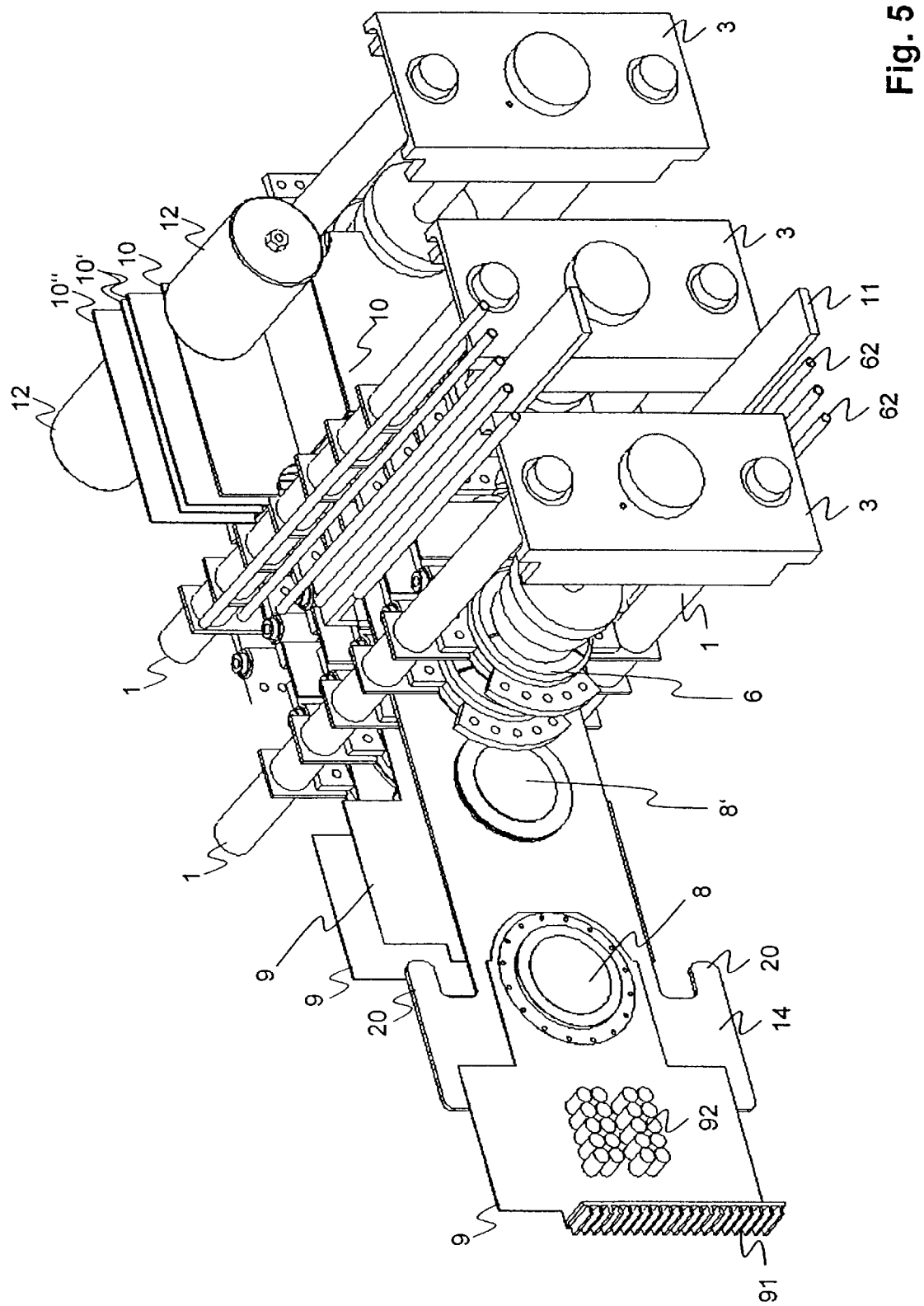
Figure 6:
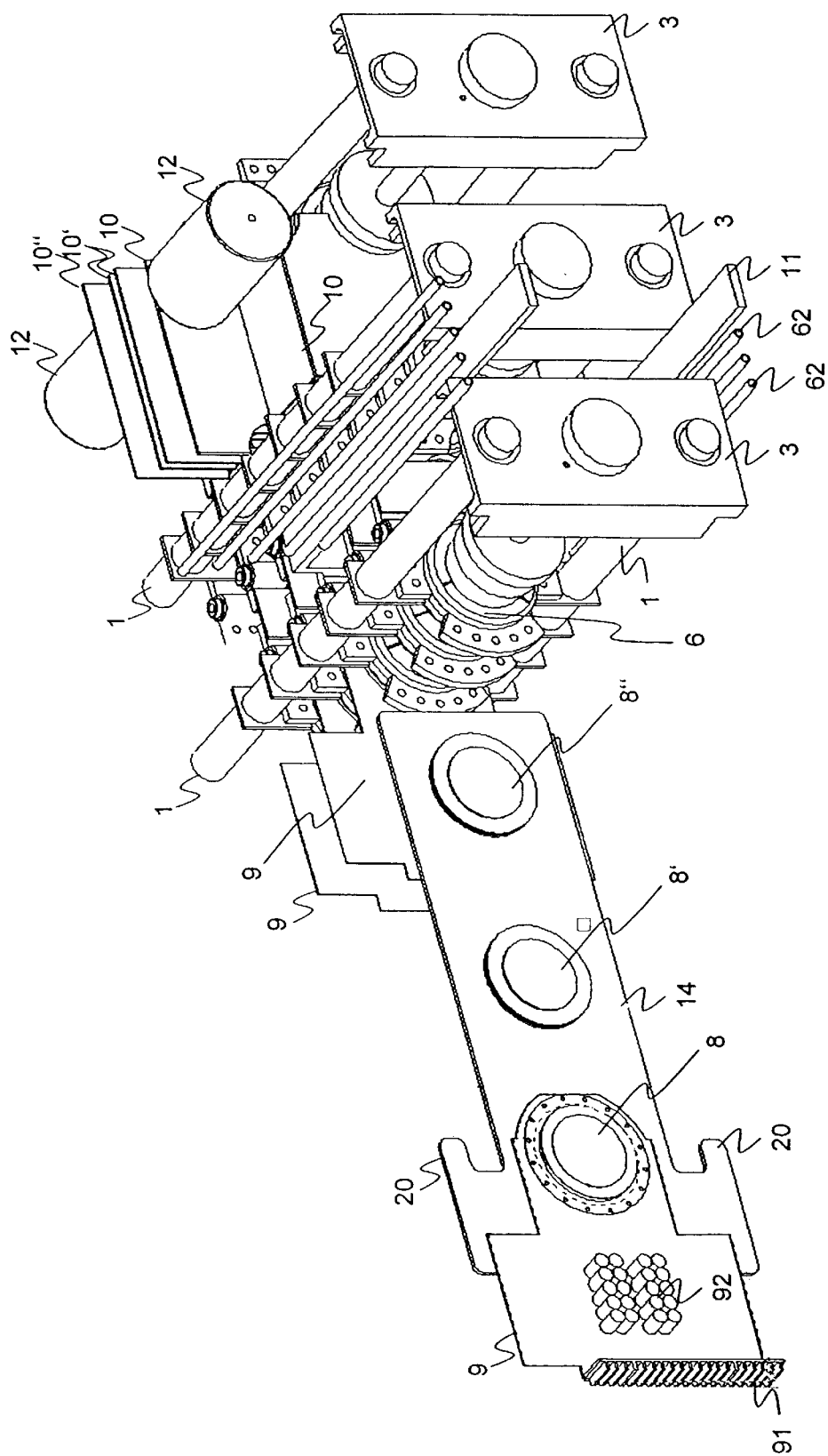

FIGS. 5 and 6 show perspective detail views of a clamped stack according to the invention in the first embodiment of the invention. In this case, a plate 14 is shown partially and, respectively, wholly pulled out in the mounting direction. In this embodiment, the mounting direction therefore leads through clamped stacks located one behind another. For two planes, which lie behind the plate 14 pulled out, only the corresponding drive board 9 but not the corresponding plate is shown. In these figures, the arrangement of the drive board 9 in relation to the plate 14 can be seen. In this case, the drive board 9 is firmly connected to an associated IGCT 8 and/or the plate 14. The drive board 9 has, in addition to electronic components not shown, a heat sink 91 and a capacitor assembly 92.

In individual planes of the clamped-stack assembly 32, a plate 14 has only two power semiconductor components 8 instead of three.

Figure 8:
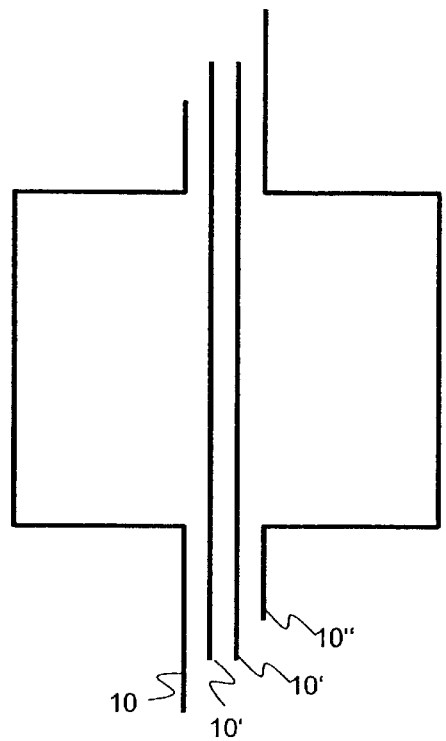
FIG. 8 shows, in schematic form, an arrangement according to the invention of intermediate-circuit plates.

FIG. 7 shows a similar arrangement to that of FIG. 5 from a different angle of view. However, the plates 14 from four planes are shown, one plate 14 being partially pulled out. Furthermore, the intermediate-circuit plates 10, 10', 10" and their arrangement are visible in particular: the two central intermediate-circuit plates 10' lie in a first plane with heat sinks 6 and are substantially flat. The two outer intermediate-circuit plates 10, 10" are bent in such a way that a central region of the respective plate lies in a second and third plane, respectively, with heat sinks 6. This arrangement is clarified by FIG. 8, which shows, in schematic form, a view of intermediate-circuit circuit plates 10, 10', 10" from the mounting direction. Only by means of such an arrangement of the plates and busbar system is it possible for the plate 14 according to the invention to be led through the entire clamped-stack assembly 32.

FIGS. 9 and 10 show schematic detail views of a variant of the first embodiment of the invention. In this, the plate 14 is detachably connected to the frame via second connecting elements 17 by means of common fixing means. FIG. 9 shows a view in the mounting direction of the front side of a clamped stack with a power semiconductor component 8, its carrier plate 14 and its fixing to two frame rods 1. FIG. 10 shows a view of the carrier plate 14 and its fixing, viewed in the axial direction A of the clamped stack. Both figures show a second connecting element 17, which is fixed to a frame rod 1 and has a guide projection 19. The plate 14 has, as common fixing means, hook-like formations on the plate 14 or guide means 20, which are hooked into the guide projection 19.

FIG. 11 shows, in schematic form, a further variant of the first embodiment of the invention. In this variant, the plate 14 has on only one side guide means 20 which can be hooked into the frame rods 1.

In a preferred embodiment of the invention, the guide means 20 are designed as connections which can be latched in and detached again. As the carrier element 14 is pushed in, the guide means 20 latch in on the second connecting element 17 and, respectively, on the frame. When loaded in tension in the mounting direction, the guide means 20 release the carrier element 14.

FIG. 12 shows a schematic detail view of a second embodiment of the invention. The figure shows a view in the mounting direction. In this second embodiment, the common fixing means are guide rails 18, which guide the plate 14 in the mounting direction. The guide rails 18 are preferably formed on the second connecting element 17 and are preferably fixed to at least two frame rods 1 located one behind another. This fixing permits an at least slight displacement of the power semiconductor component 8 along the axial direction A. As a result, when the clamped stack is loosened, the elements of the clamped stack can be loosened, so that a plate 14 can be pulled out.

Figure 13:
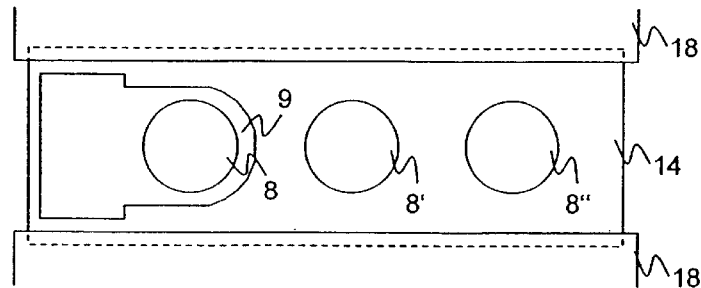
FIG. 13–15 show schematic illustrations of various variants of carrier elements according to the second embodiment of the invention.
Figure 14:
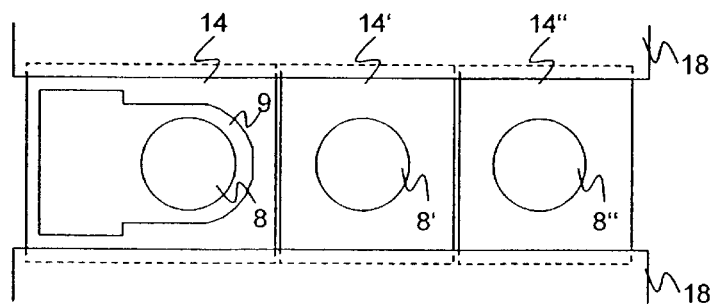
Figure 15:
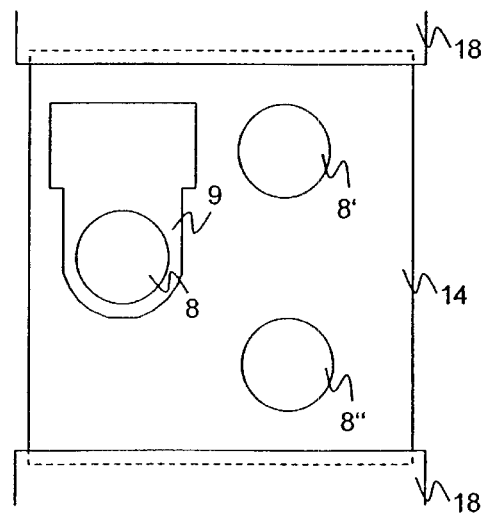

FIGS. 13 to 15 show schematic representations of various variants of plates 14 according to the second embodiment of the invention. The figures each show a view of a plate 14 in the axial direction A. The plate 14 with the power semiconductor components 8, 8', 8" is pushed into the guide rails 18, which are connected to the frame (not shown).

In FIG. 13, the power semiconductor components 8, 8', 8" on the carrier element 14 are arranged substantially on one line and on a common plate 14.

FIG. 14 shows separate carrier elements or partplates 14', 14", which are guided in the same guide rails 18 in a common mounting plane. As a result, the power semiconductor components 8, 8', 8" held in the individual part-plates 14', 14" can be pushed in or pulled out one after another in the mounting direction. This also permits individual power semiconductor components 8, 8', 8" to be interchanged and kept in stock.

In FIG. 15, the power semiconductor components 8, 8' 8" on the plate 14 are arranged substantially in a triangle. Accordingly the clamped stacks of the associated clamped-stack assembly 32 are likewise arranged in a triangle, running parallel to one another.

The common factor in all the embodiments of the invention is that power semiconductor components 8 of a clamped-stack assembly 32 which lie in a common plane can be removed or inserted in a common mounting direction within this mounting plane. This is carried out by means of a linear movement of the power semiconductor components 8 in the mounting direction. This has the advantage that access can be made from a common direction to all the power semiconductor components 8, 8', 8" located one behind another. In this case, one end face of the plate 14 is relatively small. As a result, as shown in FIG. 1, a number of clamped-stack assemblies 32 according to the invention can be arranged one above another without the ability to interchange the power semiconductor components 8, 8', 8" being impaired.

The electrical connection between electrodes of the power semiconductor components 8 is made via the heat sinks 6. The heat sinks 6 are electrically connected via busbar systems. In the present inventions, the busbar system is at least partly formed by copper plates, like the intermediate-circuit plates 10, 10', 10".

In a further embodiment of the invention, heat sinks 6 from a plurality of clamped stacks of a clamped-stack assembly 32 are assigned to one another in each case and are located in a common plane, which is perpendicular to the axial direction A of the clamped stacks. In this case, the mutually associated heat sinks 6 are not connected individually to the frame but by means of a common heat-sink holder. The common holding of a plurality of heat sinks reduces the number of parts of a clamped-stack assembly and simplifies mounting.

List of Reference Symbols

A Axial direction
1 Frame rod
2 Rod holder
3 End plate
4 End-plate reinforcement
5 Thrust rod
6 Heat sink
61 Cooling-water connection
62 Cooling-water line
8 Power semiconductor component
9 Drive board
10, 10', 10" Intermediate-circuit plates
11 Busbar
12 Clamp capacitor
13 Contact face
14 Carrier element, plate
15 Head-sink holder
16 First connecting element
17 Second connecting element
18 Guide rail
19 Guide projection
20 Guide means
21 Negative terminal
22 Positive terminal
23 Phase module
24 24', 24" Phase connection
25 Clamp circuit
26 Neutral point
32 Clamped-stack assembly
91 Heat sink
92 Set of capacitors

What is claimed is:

1. A semiconductor clamped-stack assembly, having at least two clamped stacks, each of the clamped stacks having a plurality of power semiconductor components and a plurality of heat sinks, and the power semiconductor components and heat sinks of a clamped stack being arranged in series along a horizontally extending axial direction of the clamped stack, the clamped stacks being arranged parallel to one another in a common frame, and the power semiconductor components being mounted on carrier elements, wherein power semiconductor components from different clamped stacks are assigned to one another, these mutually associated power semiconductor components are located in a common mounting plane, which is perpendicular to the axial directions of the clamped stacks, and the mutually associated power semiconductor components are capable of being, together with associated carrier elements, removed from the clamped-stack assembly or, respectively, inserted into the clamped-stack assembly in a common mounting direction which lies in the mounting plane, without further power semiconductor components having to be dismantled.

2. The semiconductor clamped-stack assembly as claimed in claim 1, wherein the mutually associated power semiconductor components have common fixing means for fixing to the frame.

3. The semiconductor clamped-stack assembly as claimed in claim 1, wherein the mutually associated power semiconductor components are mounted on a common carrier element.

4. The semiconductor clamped-stack assembly as claimed in claim 1, wherein the mutually associated power semiconductor components are mounted on individual carrier elements and can be removed or inserted, respectively, one after another.

5. The semiconductor clamped-stack assembly as claimed in claim 1, wherein the carrier elements are guided in guide rails.

6. The semiconductor clamped-stack assembly as claimed in claim 1, wherein the carrier elements are hooked in to the frame or to connecting elements by means of guide means.

7. The semiconductor clamped-stack assembly as claimed in claim 1, wherein heat sinks are connected electrically via a busbar system, and this busbar system at least partly comprises sheet metal plates.

8. The semiconductor clamped-stack assembly as claimed in claim 1, wherein heat sinks from different clamped stacks are assigned to one another, these mutually associated heat sinks are located in a common plane, which is perpendicular to the axial directions A of the clamped stacks, and the mutually associated heat sinks have a common heat-sink holder, which connects the heat sinks to the frame.

9. The semiconductor clamped-stack assembly as claimed in claim 1, wherein the power semiconductor components can be replaced by access from only one side of the clamped-stack assembly.

10. The semiconductor clamped-stack assembly as claimed in claim 1, wherein when the clamped stacks a re loosened, the power semiconductor components can be removed and inserted without mechanical aids.

11. A semiconductor clamped-stack assembly, having at least two clamped stacks, each of the clamped stacks having a plurality of power semiconductor components and a plurality of heat sinks, and the power semiconductor components and heat sinks of a clamped stack being arranged in series along a horizontally extending axial direction of the clamped stack, the clamped stacks being arranged parallel to one another in a common frame, and the power semiconductor components being mounted on carrier elements, wherein power semiconductor components from different clamped stacks are assigned to one another, these mutually associated power semiconductor components are located in a common mounting plane, which is perpendicular to the axial directions of the clamped stacks, and mutually associated power semiconductor components being capable of being removed from the clamped-stack assembly or, respectively, inserted into the clamped-stack assembly in a common mounting direction which lies in the mounting plane, wherein the carrier elements are guided in guide rails.

12. A semiconductor clamped-stack assembly, having at least two clamped stacks, each of the clamped stacks having a plurality of power semiconductor components and a plurality of heat sinks, and the power semiconductor components and heat sinks of a clamped stack being arranged in series along a horizontally extending axial direction of the clamped stack, the clamped stacks being arranged parallel to one another in a common frame, and the power semiconductor components being mounted on carrier elements, wherein power semiconductor components from different clamped stacks are assigned to one another, these mutually associated power semiconductor components are located in a common mounting plane, which is perpendicular to the axial directions of the clamped stacks, and mutually associated power semiconductor components being capable of being removed from the clamped-stack assembly or, respectively, inserted into the clamped-stack assembly in a common mounting direction which lies in the mounting plane, wherein the carrier elements are hooked in to the frame or to connecting elements by means of guide means.

13. A semiconductor clamped-stack assembly, having at least two clamped stacks, each of the clamped stacks having a plurality of power semiconductor components and a plurality of heat sinks, and the power semiconductor components and heat sinks of a clamped stack being arranged in series along a horizontally extending axial direction of the clamped stack, the clamped stacks being arranged parallel to one another in a common frame, and the power semiconductor components being mounted on carrier elements, wherein power semiconductor components from different clamped stacks are assigned to one another, these mutually associated power semiconductor components are located in a common mounting plane, which is perpendicular to the axial directions of the clamped stacks, and mutually associated power semiconductor components being capable of being removed from the clamped-stack assembly or, respectively, inserted into the clamped-stack assembly in a common mounting direction which lies in the mounting plane, wherein heat sinks are connected electrically via a busbar system, and this busbar system at least partly comprises sheet metal plates.

14. A semiconductor clamped-stack assembly, having at least two clamped stacks, each of the clamped stacks having a plurality of power semiconductor components and a plurality of heat sinks, and the power semiconductor components and heat sinks of a clamped stack being arranged in series along a horizontally extending axial direction of the clamped stack, the clamped stacks being arranged parallel to one another in a common frame, and the power semiconductor components being mounted on carrier elements, wherein power semiconductor components from different clamped stacks are assigned to one another, these mutually associated power semiconductor components are located in a common mounting plane, which is perpendicular to the axial directions of the clamped stacks, and mutually associated power semiconductor components being capable of being removed from the clamped-stack assembly or, respectively, inserted into the clamped-stack assembly in a common mounting direction which lies in the mounting plane, wherein when the clamped stacks are loosened, the power semiconductor components can be removed and inserted without mechanical aids.

* * * * *

UNITED STATES PATENT AND TRADEMARK OFFICE
CERTIFICATE OF CORRECTION

PATENT NO.    : 6,495,913 B2
DATED         : December 17, 2002
INVENTOR(S)   : Horst Gruning It is certified that error appears in the above-identified patent and that said Letters Patent is hereby corrected as shown below:

<u>Title page,</u>
Item [73], please correct to read -- [73] Assignee: ABB Schweiz AG, Baden (CH) --

Signed and Sealed this

Fourteenth Day of October, 2003

JAMES E. ROGAN
*Director of the United States Patent and Trademark Office*